July 12, 1966 B. RANKIN 3,260,453
SLIDE RULE
Filed May 7, 1964 2 Sheets-Sheet 1
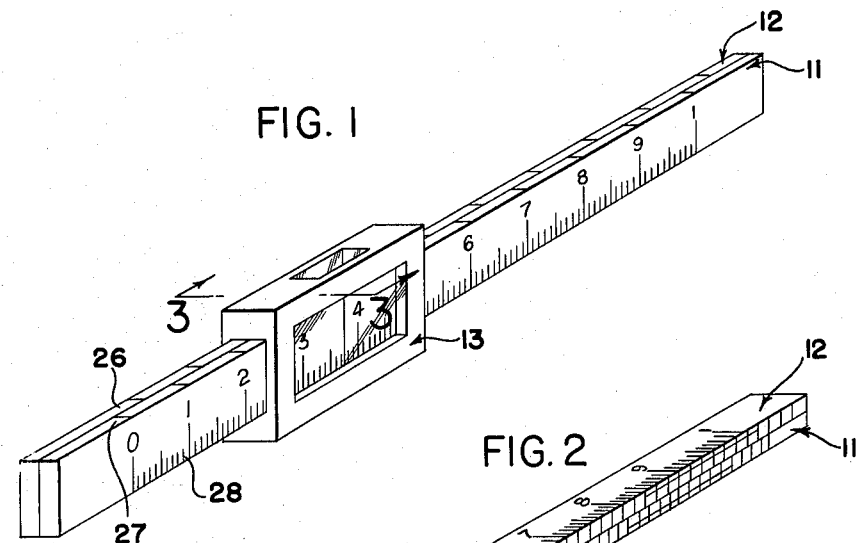
FIG. 1
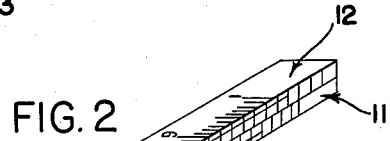
FIG. 2
FIG. 3
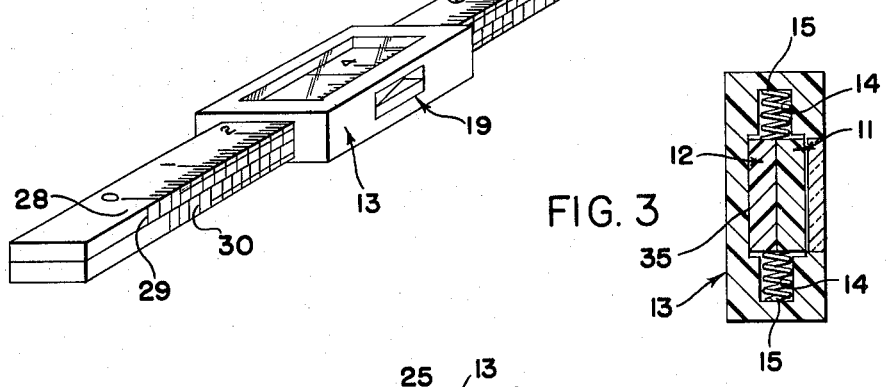
FIG. 4
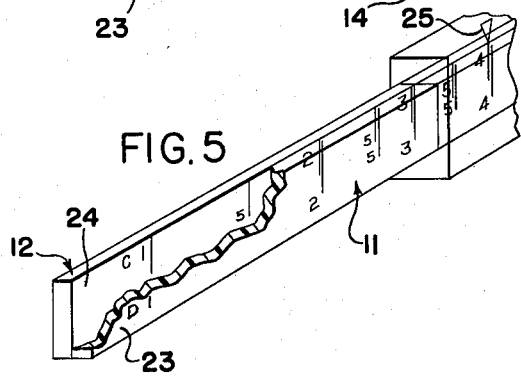
FIG. 5
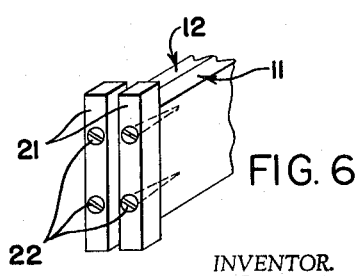
FIG. 6
INVENTOR.
BAYARD RANKIN
BY Williams, David
Hoffmann & Yount
ATTORNEYS

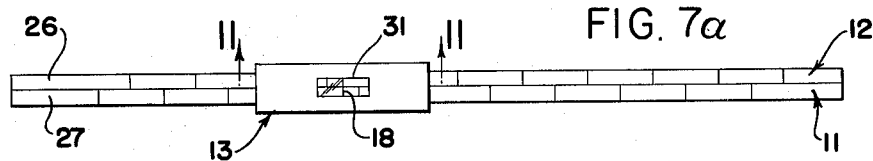
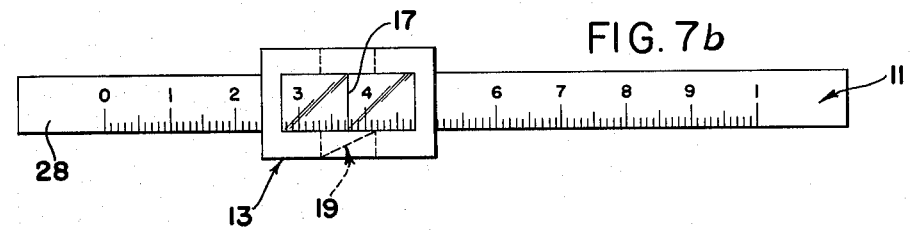
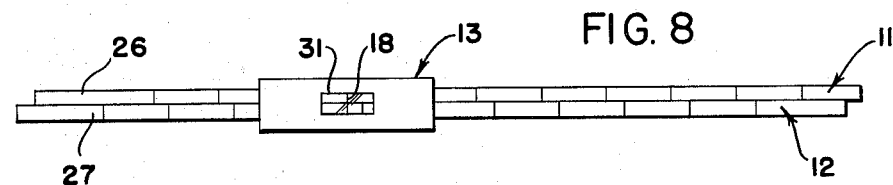
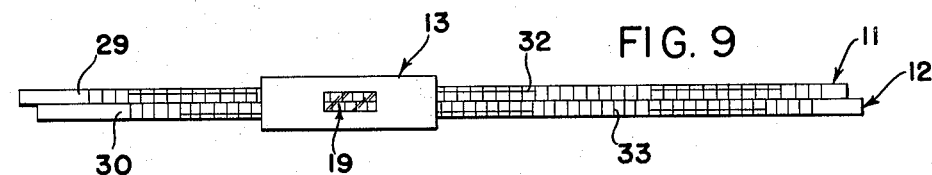
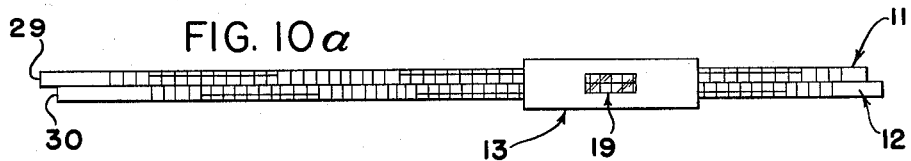
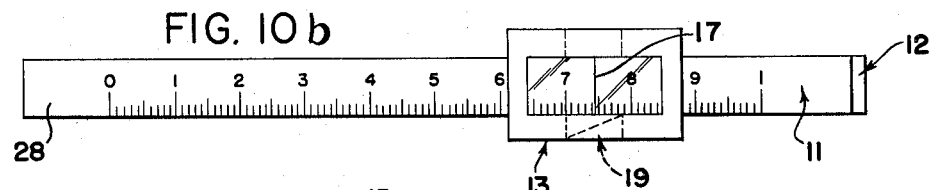
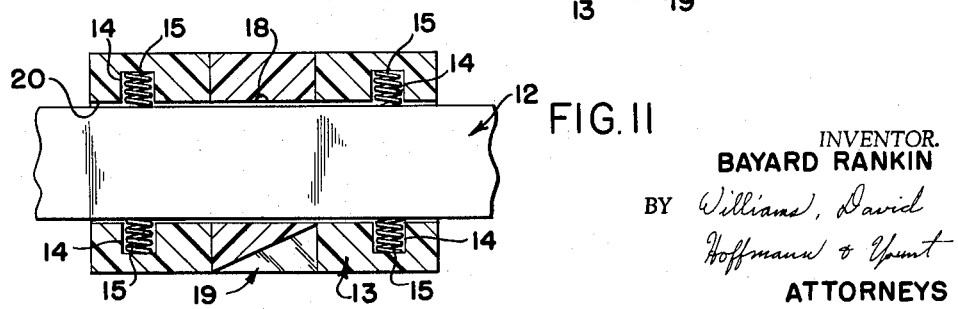

United States Patent Office 3,260,453
Patented July 12, 1966

3,260,453
SLIDE RULE
Bayard Rankin, 2853 Coleridge Road,
Cleveland Heights, Ohio
Filed May 7, 1964, Ser. No. 365,628
4 Claims. (Cl. 235—70)

This invention relates generally to slide rules and more particularly to a new and simplified slide rule structure.

In the broadest sense, this invention contemplates a slide rule of a highly simplified construction which includes a plurality of body members, each having a number of scales inscribed thereon, and a cursor body mounting a number of cursor position-determining bodies, such as hairlines. The cursor body has an opening therethrough to slidably receive the body members. The body members are arranged to permit relative sliding movement therebetween and with respect to the cursor body.

The structure includes suitable means to eliminate the possibility of the cursor body sliding off the ends of the body members, such as a stop on the end portions of each member. Further means are provided to maintain a constant contact pressure between the cursor body and the body members. In addition, these pressure creating means maintain the body members axes parallel to each other and to avoid possible rotation or displacement of one body member with respect to another.

Prior art devices have presented problems in that they show a slide rule with grooves or mortise joints for overlapping the body members of the rule and transverse supports between separate but rigidly fixed parallel body members (as in the conventional double faced slide rule). These grooved portions have been the source of costly and time-consuming manufacture. These prior devices have required that their body members be grooved in order to eliminate relative bending of the body members and to give these prior art rules a greater degree of stability. On the other hand, the transverse supports have further been required by the prior art to add stability to the slide rule and to provide a means to realign the slide rule, since when these prior art slide rules are misused, the fixed upper and lower body members' scales may move relative to each other which necessitates a method of realignment.

Another problem which has been presented and not solved by the prior art is the problem of fluctuating frictional forces due to the expansion, contraction, or misalignment of the body members. The conventional slide rule materials, bamboo and metal, are especially susceptible to this problem. In general, these frictional forces may be said to be concentrated in the grooved portions of the body members when assembled. Due to changes in temperature, extreme pressure on one or both ends, or variations in the tolerance of the grooves, the frictional force required to move one body member with respect to another varies, and in some cases, these sources of friction may yield the slide rule completely inoperable as the body members are frictionally engaged with each other.

The prior art also has been in search of a slide rule design which presents an economical use of the slide rule material in order to decrease the surface area per number of display scales. To date, in most cases only one side of a rectangularly shaped slide rule is used and in other cases two sides are utilized.

Therefore, it is seen that in general the slide rule of the immediate invention has the advantage of simple construction over that taught by the prior art in that it eliminates a stationary body member with fixed end portions and grooved body members.

More specifically, the slide rule of the immediate invention eliminates the frictional and manufacturing problems incurred when using grooved body members, by completely eliminating all grooved portions. In addition, the transverse supports are eliminated by presenting a rule which needs no adjustment.

An additional property of the immediate invention is a slide rule having a more stable construction and hence may be used in the most severe conditions. This unexpected stability is achieved by slightly lengthening the cursor body and inserting a spring into each end thereof in a manner such that each spring will contact both body members simultaneously. Thus, it is seen that when a slight axial rotation of one body member with respect to the other body member is effected, the compensatory force of the springs will return the body members to their aligned position.

With these problems of the prior art devices in mind, it is a general object to provide a slide rule of extremely simplified construction.

In order to accomplish this objective, it is a more specific object to provide a slide rule which eliminates the use of a fixed body member while maintaining the stability through the use of the cursor body.

It is another object of this invention to provide a slide rule which requires no adjustment or alignment.

It is still another object to provide a slide rule requiring a reduced surface area per number of display scales.

It is yet another object of the invention to provide a slide rule which has a greater number of combinations and permutations of various scales.

Other and more specific objects of the invention will become apparent from the following detailed description, the accompanying drawings, and the appended claims.

In the drawings:

FIG. 1 is a perspective view showing the slide rule;

FIG. 2 is a perspective view showing the lower edge scale and top scale of the slide rule;

FIG. 3 is a sectional view of the cursor and body members taken along line 3—3 of FIG. 1;

FIG. 4 is a front view showing a transparent top scale;

FIG. 5 is a fragmentary perspective view of FIG. 4;

FIG. 6 is a fragmentary view of a modified form of FIG. 1 showing end stops;

FIG. 7a is a top view of the slide rule in a position where certain scales are aligned;

FIG. 7b is a front view of the slide rule in a position where certain scales are aligned;

FIG. 8 is a top view of the slide rule in a specifically displaced position;

FIG. 9 is a bottom view of the slide rule in a specifically displaced position;

FIG. 10a is a bottom view of the slide rule in a displaced position, with the cursor properly positioned;

FIG. 10b is a front view of the slide rule in a displaced position with the cursor properly positioned; and FIG. 11 is a fragmentary front sectional view of the cursor and body members taken along line 11—11 of FIG. 7a.

Referring to the drawings, FIG. 1 shows a slide rule of the immediate invention having body members 11 and 12 which have a plurality of scales thereon. These body members are held in contact by the cursor body 13, which has apertures 14 drilled at its ends, adapted to receive the springs 15. Both the cursor body and body members may be composed of any material with favorable properties, such as plastic, metal, or wood. The cursor body 13 may be fabricated by any suitable joining means, such as screws, or a common glue, such as an epoxy.

Mounted above the cursor body are a number of hairlines 17 and 18. It is clearly seen that these hairlines may be positioned over one, two, three, or all sides. These hairlines are positioned, in general, in a plane which is perpendicular to the longitudinal axis of body members 11, and 12, in order to use a great number of combinations of scales on the body members 11 and 12. It is to be realized, however, that these cursor hairlines in all probability will lie in parallel planes and that their relative positions are determined by the relative positions of the scales and each scale's specific design. A cursor portion could be replaced by an optical vernier system 19, as taught in my copending application, Serial No. 365,629, filed May 7, 1964, in order to increase the accuracy of a samll rule.

The cursor body 13 constructed as shown in FIG. 11 has apertures 14 at its ends adapted to receive springs 15, with openings in its midsection adapted to receive and mount viewing means, such as cursor hairlines, magnifying hairlines, or optical vernier means. Aperture 20 of cursor body 13 is especially designed and designated to receive slidably body members 11 and 12, while they are slidably engaged with each other. The slight spacing 35 between the width of the body members 11 and 12 and the sides of the cursor body 13 is so specified that thermal expansion will cause substantially little or no contact pressure between the body members and cursor body.

On the top and bottom edges where the springs contact the body members, change in frictional force between the cursor and body members, for all practical purposes, is negligible. Since this frictional force is related directly to the deflection of the spring, it is easily seen that deflections due to expansion or contraction of the slide rule material will create a negligible change in frictional force. This will eliminate the problem of the slide rule body members sticking to one another, or to the cursor body.

Furthermore, the springs compensate each other since they engage both body members by an equal amount, as shown in FIG. 3. When there is a rotation of one body member with respect to another, the spring at the top of one end will push down on a body member and the spring at the bottom of the other end will push up on the body member. For the other relatively rotated body member, the former bottom end spring will push up and the latter top spring will push down. Through this coaction of the four springs, the axis of each of the body members is maintained in parallel direction.

The stops 21 shown in FIG. 6 are connected to the ends of body members 11 and 12 at their extreme ends by any conventional connecting means, such as screws 22. It is to be understood that other conventional connecting means, such as a mechanical device or a bonding agent also can be used. Stops 21 are positioned in this manner in order to eliminate the possibility of disassembling the slide rule accidentally.

It can be seen that the principles of the present invention are readily adaptable to a multitude of slide rules of specialized design. One of these body members may be composed of a transparent or opaque material, such as transparent Plexiglas, methyl acrylate, or an opaque material, such as polyvinylchloride. A combination of transparent and opaque materials may be used for the slide rule, or one of entirely transparent material could be used to increase the number of scales per unit of surface area. Even in the case of entirely opaque body members an increase in the number of scales is effected through the utilization of all four visible sides of the rule.

In the embodiment shown in FIG. 4, body member 11 is transparent and body member 12 is opaque. One face 23 of transparent body member 11, scale D is inscribed in an inverted manner and scale C is inscribed on the face 24 of opaque body member 12. Since these two scales are in contact with each other, parallax can be eliminated. Furthermore, by manufacturing the cursor body of transparent material and inscribing a pointer 25 in essentially the same plane as scales C and D on faces 24 and 23 respectively, a reading pointer is effected. For clarity of reading, either scale C or scale D may have the calibration markings lowered a slight amount, as shown in FIG. 4 where the integer markings on scale D are lower than those on scale C, to make easier reading possible.

A further extension of this principle would be to include an embodiment where both members 11 and 12 are transparent. In such an embodiment, the slide rule would be operative with scales inscribed on any of the four surfaces of either body member, by means of a common hairline extending around the body members in a plane perpendicular to the longitudinal axis of the body members. Furthermore, such a slide rule is especially adapted to combination with the vernier technique as disclosed in my said copending application, Serial No. 365,629, and random number generation system as taught in my copending application, Serial No. 365,626 filed May 7, 1964.

This random number generation may best be effected if the scales are designated as follows: Scale 26 on body member 12 has an inscribed mark every major division of the expanded linear scale 28 where the major division of expanded linear scale 28 is defined as the distance from one integer on the expanded linear scale 28 to another. Scale 27 has equally spaced markings every major division of the expanded linear scale 28. Its markings lie in a plane perpendicular to the longitudinal axis of body member 11 and intersect the inscriptions 0, 1, 2, 3, 4, etc. on scale 28. This scale 27 is fixed with respect to body member 11 and to scales 28 and 29. Scale 26 is so oriented with respect to scale 27 that its inscribed markings divide in half, or bisect the divisions of scale 27, and scale 28 when it is in a neutral position.

The vernier scale 30 and linear scale 29 are designed and designated as taught in my said copending application, Serial No. 365,626. More specifically, the divisions denoted by bars are equal to the distance between two major divisions on scale 28. These, in turn, are divided into ten divisions throughout the length of the rule. A major division of scale 30 is equal to nine-tenths of a major division of scale 29, and the major divisions of scales 29 and 30 are divided into ten equal portions. This is further explained and exploited in my copending application.

In order to generate a random number by using this slide rule and my technique, as illustrated in said copending application, Serial No. 365,626, the first step is to select a specific number. Take for example, 3.75 plus error, since there will be some error in setting the cursor 17 on the exact 3.75 position on scale 28. After this setting has been made, body member 12 is moved in a manner such that the division on the scale 26 of body member 12 moves in a direction toward the division on scale 27 of body member 11, which lies inside the cursor window 31. The size of the cursor window 31 is determined by equating its length to the length of one of the major divisions on standard linear scale 28. This movement is effected until the division of scale 26 aligns with the cursor 18 in the window 31, as shown in FIG. 8. The slide rule then is turned over to view the relative positions of scales 29 and 30. It is quickly noticed which major division on scales 29 covers the major division of scale 30, which is shown by the combination of divisions 32 and 33 on scales 29 and 30 respectively. The cursor then is slid over and the subdivisional scales of the divisions 32 and 33 are aligned in a manner described in said copending application, Serial No. 365,626. The slide rule then is turned over to view scale 28 as shown in FIG. 10b and an accurate reading is taken of ten times the fractional part of a number.

In effect what has happened is that by moving scale 26 relative to scale 27, the scale 30 is moved relative to scale 29 in a manner such that when a number such as 3.75 plus error is given, an operation will produce a number such as 7.5 plus error. After completing this operation a number of times, possibly 3 or 4 times, a completely random number will be effected due to the inherent error of setting the slide rule.

For ease of description, the principles of the invention have been set forth in full in connection with but a single illustrated embodiment. It is not my intention that the

What I claim is:

1. A slide rule comprising a plurality of relatively movable contacting body members having scales positioned thereon, said body members having adjacent sides in abutting contact, the abutting portion of each side lying in a single plane, and movable cursor means comprising a cursor body movable relative to said body members and having a passage therethrough through which said body members extend, and support and guide means on and forming a part of said cursor means constituting the sole means for retaining the surfaces of said body members in contact and said members in alignment and for frictionally resisting movement of said members relative to said cursor body only, said means on said cursor body operable to retain said planar surfaces in abutting contact and in alignment comprising biasing means acting between said body members and said cursor body and applying forces against said body members in a direction parallel to said abutting planar surfaces to fritcionally resist movement of said members relative to said cursor body.

2. A slide rule comprising a pair of relatively movable scale members having scales positioned thereon, said scale members having abutting sides with the entire abutting surface of said sides lying in a single plane and outer sides extending transversely to said abutting sides, a cursor body movable relative to said scale members and receiving said scale members for free sliding movement relative thereto and to each other, biasing means acting between said cursor body and said scale members for applying loading forces to said scale members to maintain said scale members in alignment and to frictionally resist movement of said scale members relative to said body, said biasing means applying loading forces to said scale members which act only in a direction along said plane.

3. A slide rule as defined in claim 2 wherein said biasing means comprising a plurality of coil springs acting in opposite directions against said scale members with each spring contacting both of said members.

4. A slide rule comprising a pair of relatively movable scale members rectangular in cross-section having abutting sides with the entire abutting portions of said sides lying in a single plane and outer sides transverse to said abutting sides and additional outer sides parallel to said abutting sides joining said transverse sides, a cursor body receiving said scale members for free sliding movement of each scale member relative to said sliding body and to each other, means on said cursor body engaging each of said outer sides for limiting movement of said scale members away from each other in a direction transverse to said planes and for applying forces to said members having no appreciables component toward said plane to maintain alignment in a plane transversely of said plane and to frictionally resist movement of said members relative to said cursor body while maintaining free relative movement between said abutting surfaces.

References Cited by the Examiner

UNITED STATES PATENTS

| 1,609,972 | 12/1926 | Sherrer et al. | 235—70.1 |
| 1,892,012 | 12/1932 | Seehase | 235—70 |
| 2,091,661 | 8/1937 | Von Forster et al. | 235—70 |
| 2,138,879 | 12/1938 | Poole | 235—70 |
| 2,207,375 | 7/1940 | Friedell. | |
| 2,341,681 | 2/1944 | Anderson | 235—70.2 |
| 2,387,404 | 10/1945 | Moyer | 235—70.2 |
| 2,435,133 | 2/1948 | Durand | 235—70 |
| 2,514,326 | 7/1950 | Giles | 235—70 |

FOREIGN PATENTS

| Ad. 69,641 | 11/1958 | France. |
| 207,234 | 4/1907 | Germany. |
| 603,793 | 6/1948 | Great Britain. |

LOUIS J. CAPOZI, *Primary Examiner.*

LEO SMILOW, *Examiner.*

C. G. COVELL, J. G. MURRAY, *Assistant Examiners.*